US012585648B2

(12) United States Patent
Baker et al.

(10) Patent No.: US 12,585,648 B2
(45) Date of Patent: Mar. 24, 2026

(54) EFFICIENT QUERY EXECUTION FOR ONTOLOGY-BASED DATABASES

(71) Applicant: Palantir Technologies Inc., Denver, CO (US)

(72) Inventors: James Baker, Maidenhead (GB); Xavier Falco, London (GB); Samuel Flavio Barroso Souza, London (GB); Amr Al Mallah, Tacoma, WA (US); Yixun Xu, Jersey City, NJ (US); Arseny Bogomolov, Arlington, VA (US); Sławomir Mucha, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/768,985

(22) Filed: Jul. 10, 2024

(65) Prior Publication Data

US 2025/0355868 A1     Nov. 20, 2025

Related U.S. Application Data

(60) Provisional application No. 63/648,058, filed on May 15, 2024.

(51) Int. Cl.
*G06F 16/24* (2019.01)
*G06F 11/34* (2006.01)
(Continued)

(52) U.S. Cl.
CPC .... *G06F 16/24534* (2019.01); *G06F 11/3419* (2013.01); *G06F 21/6218* (2013.01); *G06F 2221/2141* (2013.01)

(58) Field of Classification Search
None
See application file for complete search history.

(56) References Cited

U.S. PATENT DOCUMENTS 8,332,389 B2    12/2012  Bestgen et al.
8,650,634 B2    2/2014   Bajekal
(Continued)

OTHER PUBLICATIONS

"Documentation: Spark > Core Concepts." Palantir, Retrieved Apr. 30, 2024, www.palantir.com/docs/foundry/optimizing-pipelines/spark-concepts/, 6 pages.
(Continued)

*Primary Examiner* — Eliyah S. Harper
(74) *Attorney, Agent, or Firm* — Duane Morris LLP

(57) ABSTRACT

A system for efficient query execution over ontology-based databases and related methods are disclosed. The system is programmed to receive an ontology query from a user account against an ontology having access controls, and transform the ontology query into a set of database queries, including a set of exact aggregations or joins. The system is programmed to then estimate how much data processing is to be performed in executing the set of exact aggregations or joins, considering how much data in the ontology can be accessed by the user account under the access controls. Upon determining that the estimated amount of data processing exceeds a threshold, the system is programmed to route the set of exact aggregations or joins to a set of nodes optimized for large-scale data processing.

20 Claims, 7 Drawing Sheets

(51) Int. Cl.
  *G06F 16/2453*      (2019.01)
  *G06F 21/62*       (2013.01)

(56)              References Cited

U.S. PATENT DOCUMENTS

| | | | |
|---|---|---|---|
| 9,690,792 | B2 | 6/2017 | Bartlett et al. |
| 10,817,613 | B2 * | 10/2020 | Akselrod ............... G06F 40/295 |
| 11,080,336 | B2 * | 8/2021 | Van Dusen ............ G06Q 50/01 |
| 11,544,264 | B2 | 1/2023 | Mathew et al. |
| 11,971,888 | B2 | 4/2024 | Chen et al. |
| 12,124,472 | B2 | 10/2024 | Kramer et al. |
| 12,174,992 | B1 * | 12/2024 | Fakhraie ............. G06F 21/6245 |
| 2004/0003132 | A1 * | 1/2004 | Stanley ................... G06F 16/20 |
| | | | 719/316 |
| 2006/0165040 | A1 * | 7/2006 | Rathod ................. G06Q 10/10 |
| | | | 370/335 |
| 2011/0276396 | A1 * | 11/2011 | Rathod ............... G06F 16/2428 |
| | | | 707/706 |
| 2014/0310302 | A1 | 10/2014 | Wu et al. |
| 2016/0117195 | A1 | 4/2016 | Wang |
| 2018/0322168 | A1 | 11/2018 | Levine et al. |
| 2019/0155804 | A1 | 5/2019 | Miller et al. |
| 2021/0294970 | A1 | 9/2021 | Bender et al. |
| 2022/0253474 | A1 | 8/2022 | Acharya |
| 2023/0273947 | A1 * | 8/2023 | Weitzner ............. G06F 16/2455 |
| | | | 707/718 |
| 2023/0297550 | A1 * | 9/2023 | Kumar ................. G06F 16/258 |
| | | | 707/756 |
| 2023/0315529 | A1 | 10/2023 | Gristede et al. |
| 2023/0418793 | A1 * | 12/2023 | Urdiales ............... G06F 16/215 |
| 2024/0095680 | A1 * | 3/2024 | Lee .................... G06Q 10/1053 |
| 2024/0354326 | A1 * | 10/2024 | Baker ................. G06F 16/2365 |

OTHER PUBLICATIONS

"Documentation: Overview and Getting Started > Aggregation Considerations." Palantir, Retrieved Apr. 29, 2024, www.palantir.com/docs/foundry/object-backend/aggregation-considerations/, 8 pages.

Minier, Thomas, et al., "SaGe: Preemptive Query Execution for High Data Availability on the Web," Hal Open Science, Jun. 3, 2018, https://hal.science/hal-01806486, 17 pages.

"Fair Scheduler—Apache Hadoop," The Apache Software Foundation, May 18, 2022, https://hadoop.apache.org/docs/r1.2.1/fair_scheduler.html, 7 pages.

Extended European Search Report in EP Application No. 25176171.4, dated Oct. 10, 2025, 9 pages.

Extended European Search Report in EP Application No. 25179700.7, dated Oct. 31, 2025, 10 pages.

Endris, Kemele, et al. "Chapter 5 Federated Query Processing", Jul. 16, 2020, Jul. 16, 2020, p. 73-86, XP047557047.

U.S. Appl. No. 18/807,823, filed Aug. 16, 2024.

U.S. Appl. No. 18/882,541, filed Sep. 11, 2024.

U.S. Appl. No. 18/807,823, Notice of Allowance and Fees Due, Mailing Date Nov. 13, 2025.

"Greenplum Database 3.2 Administrator Guide", Internet Citation, Oct. 1, 2008 (Oct. 1, 2008), pp. 1-849, XP008149266, Retrieved from the Internet: URL: http://docs.huihoo.com/greenplum/GPDB-3.2-AdminGuide.pdf [retrieved on Feb. 22, 2012].

Extended European Search Report in EP Application No. 25185344.6, dated Dec. 16, 2025, in 11 pages.

* cited by examiner

```
402
const passengersDepartingFromAirport = Objects.search()
  .flights()
  .filter(flight => flight.departureAirportCode.exactMatch(airportCode))
  .searchAroundPassengers();
```

```
404
const passengersDepartingFromAirport = Objects.search()
  .buildings()
  .filter(building => Filters.and(
    building.maxOccupancy.gt(100),
    building.inFloodZone.isTrue()
  ))
```

FIG. 4

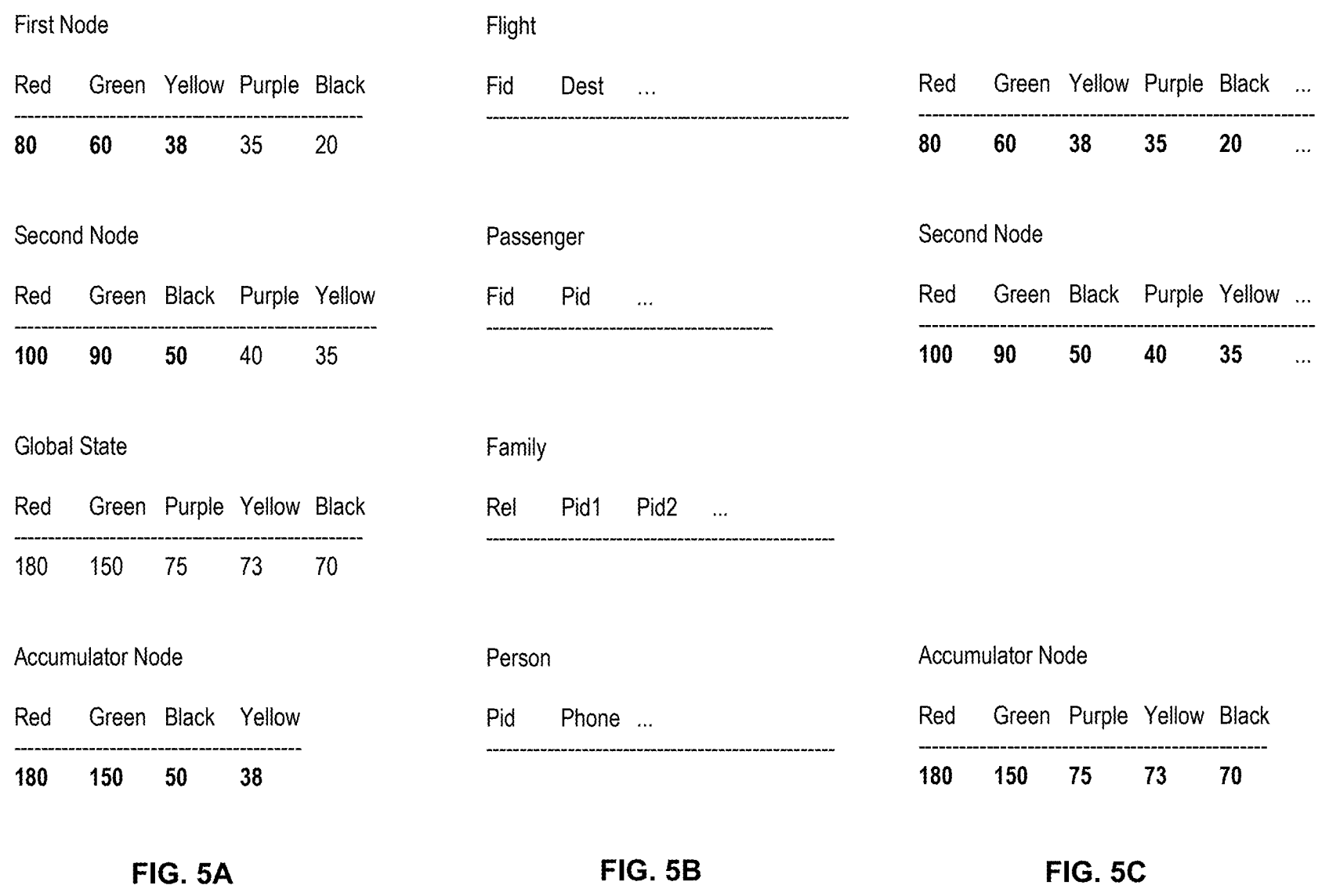

First Node

| Red | Green | Yellow | Purple | Black | ... |
| --- | --- | --- | --- | --- | --- |
| 80 | 60 | 38 | 35 | 20 | ... |

Second Node

| Red | Green | Black | Purple | Yellow | ... |
| --- | --- | --- | --- | --- | --- |
| 100 | 90 | 50 | 40 | 35 | ... |

Accumulator Node

| Red | Green | Purple | Yellow | Black |
| --- | --- | --- | --- | --- |
| 180 | 150 | 75 | 73 | 70 |

FIG. 5C

Flight

| Fid | Dest | ... |
| --- | --- | --- |

Passenger

| Fid | Pid | ... |
| --- | --- | --- |

Family

| Rel | Pid1 | Pid2 | ... |
| --- | --- | --- | --- |

Person

| Pid | Phone | ... |
| --- | --- | --- |

FIG. 5B

First Node

| Red | Green | Yellow | Purple | Black |
| --- | --- | --- | --- | --- |
| 80 | 60 | 38 | 35 | 20 |

Second Node

| Red | Green | Black | Purple | Yellow |
| --- | --- | --- | --- | --- |
| 100 | 90 | 50 | 40 | 35 |

Global State

| Red | Green | Purple | Yellow | Black |
| --- | --- | --- | --- | --- |
| 180 | 150 | 75 | 73 | 70 |

Accumulator Node

| Red | Green | Black | Yellow |
| --- | --- | --- | --- |
| 180 | 150 | 50 | 38 |

FIG. 5A

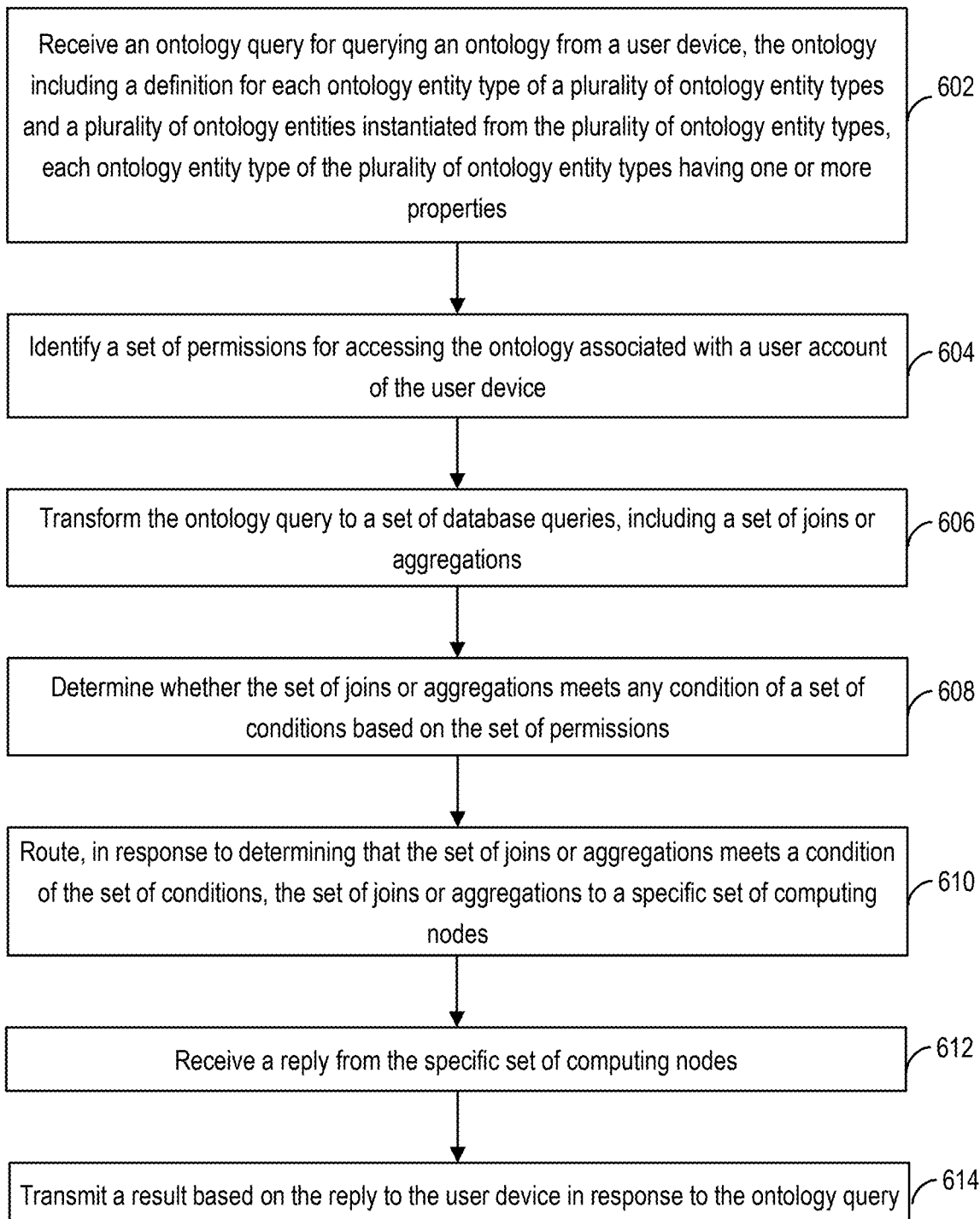

Receive an ontology query for querying an ontology from a user device, the ontology including a definition for each ontology entity type of a plurality of ontology entity types and a plurality of ontology entities instantiated from the plurality of ontology entity types, each ontology entity type of the plurality of ontology entity types having one or more properties — 602

Identify a set of permissions for accessing the ontology associated with a user account of the user device — 604

Transform the ontology query to a set of database queries, including a set of joins or aggregations — 606

Determine whether the set of joins or aggregations meets any condition of a set of conditions based on the set of permissions — 608

Route, in response to determining that the set of joins or aggregations meets a condition of the set of conditions, the set of joins or aggregations to a specific set of computing nodes — 610

Receive a reply from the specific set of computing nodes — 612

Transmit a result based on the reply to the user device in response to the ontology query — 614

FIG. 6

EFFICIENT QUERY EXECUTION FOR ONTOLOGY-BASED DATABASES

BENEFIT CLAIM

This application claims the benefit under 35 U.S.C. § 119(e) of U.S. Provisional Application No. 63/648,058, titled "EFFICIENT QUERY EXECUTION FOR ONTOLOGY-BASED DATABASES" and filed on May 15, 2024, the entire contents of which are hereby incorporated by reference as if fully set forth herein.

TECHNICAL FIELD

The present disclosure relates to ontology-based database operations, and more particularly to database operations related to querying and access control.

BACKGROUND

Data originating from data sources can be organized and structured according to an ontology, which facilitates understanding of and access to the data. The ontology can be backed by databases where the data is stored. It would be helpful to properly manage the databases while fully supporting operations of the ontology.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 4 illustrates examples calls to an application programming interface (API) for querying an ontology.

FIG. 5A illustrates an example scenario for computing aggregations.

FIG. 5B illustrates an example scenario for computing joins.

FIG. 5C illustrates another example of computing aggregations.

FIG. 6 illustrates a process of efficient query execution over ontology-based databases in accordance with disclosed embodiments.

DETAILED DESCRIPTION OF CERTAIN EMBODIMENTS

Figure 1:
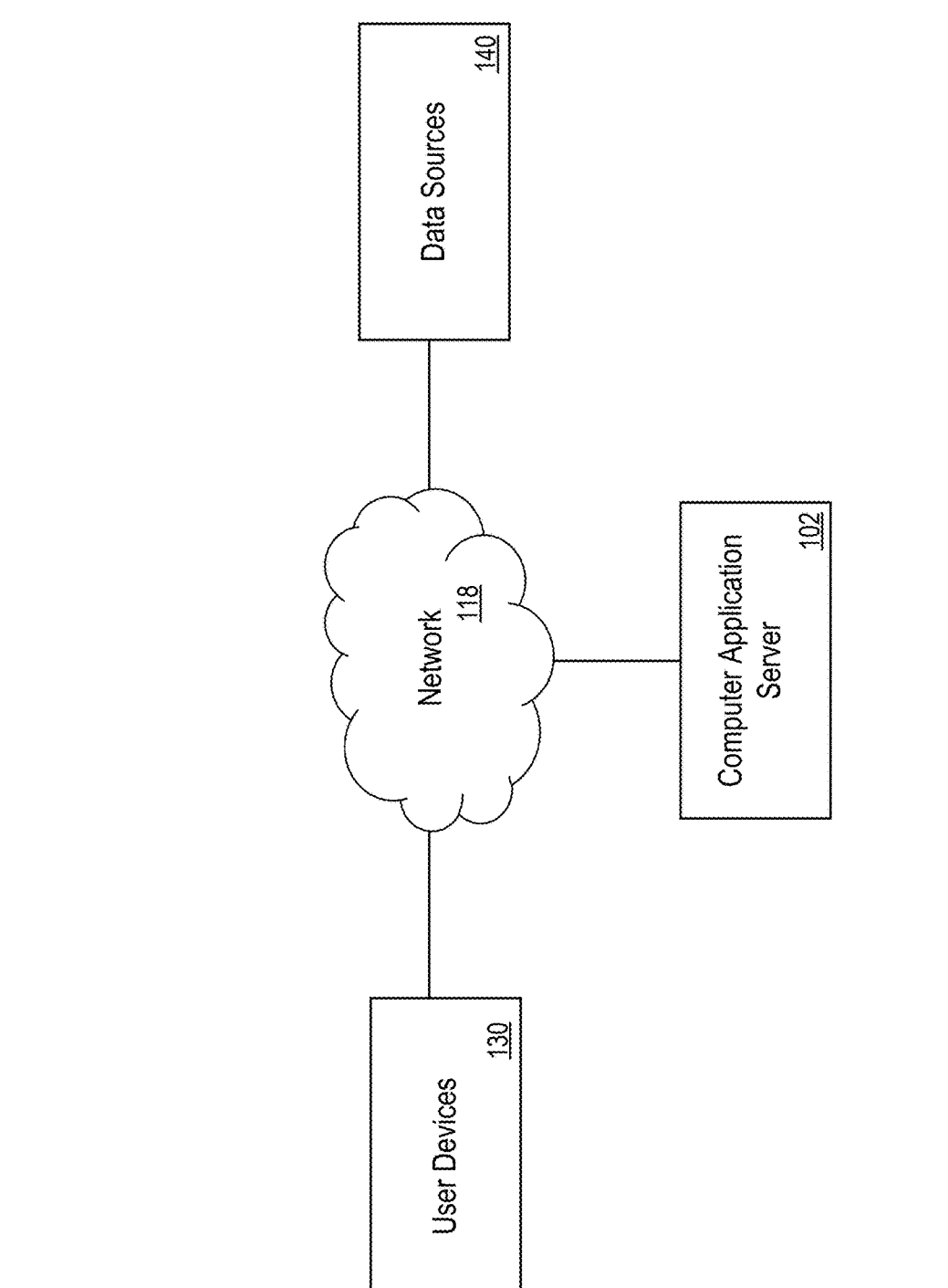
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system for efficient query execution over ontology-based databases and related methods are disclosed. The system is programmed to receive an ontology query from a user account against an ontology having access controls, and transform the ontology query into a set of database queries, including a set of exact aggregations or joins. The system is programmed to then estimate how much data processing is to be performed in executing the set of exact aggregations or joins, considering how much data in the ontology can be accessed by the user account under the access controls. Upon determining that the estimated amount of data processing exceeds a threshold, the system is programmed to route the set of exact aggregations or joins to a set of nodes optimized for large-scale data processing.

In some embodiments, the system is programmed to manage the ontology, which includes definitions of ontology entity types, and ontology entities that are instantiated from the ontology entity types. An ontology entity type is generally an object type or a link type and has one or more properties. For example, an ontology object type can correspond to a person and has properties corresponding to a person's residence and occupation, and an ontology link type can correspond to a relationship between two people.

In some embodiments, the system is programmed to represent each ontology entity type and thus each ontology entity of the ontology entity type in multiple forms respectively in multiple databases having different capabilities. As one example, a first database can be a relational database that is particularly suitable for exploring properties of ontology entities, while a second database can be a graph database that is especially suited for exploring relationships between ontology entities. As another example, a third database can represent certain properties in a compressed or encrypted form that is not suitable for querying, while a fourth database can include an index for a certain combination of properties that facilitate specific access to the combination of properties.

In some embodiments, the system is programmed to receive an ontology query against the ontology from a user account. A first example is finding the top three colors for cars in New York, which involves computing maximums over ontology entities. A second example is finding names of family members of passengers of a flight that arrived in New York, which involves combining data from different ontology entity types. The system can be programmed to select one or more databases where the ontology entity types covered by the ontology query are represented. In the second example above, the ontology entity types covered by the ontology query can be the person object type, family link type, passenger link type, and flight object type. Therefore, the system can be configured to find one or more databases that represent these ontology entity types and allow efficient processing of ontology entities of these ontology entity types. Each of the one or more databases can be selected because it represents a large number of the relevant ontology entity types, or enables fast access of relevant properties of these ontology entity types, for instance. The system can then be further programmed to transform the ontology query into database queries based on transformations between definitions for these ontology entity types and schemas for the one or more databases.

In some embodiments, the system is programmed to assess the complexity of the database queries, specifically exact aggregations or joins, which can require substantial data processing. For an exact aggregation, the system can be programmed to consider the number of values to be aggregated, transmitted, or stored as well as the size of these values. For a join, the system can be programmed to consider the number of values to be joined, transmitted, or stored as well as the size of these values. For any of these database queries, the system is also programmed to evaluate how the set of permissions associated with the user account can reduce the number of values to be processed. In the second example above, the set of permissions associated with the user account may disallow accessing information regarding flight objects having the property value of arriving in certain airports in New York. When each flight object is represented as a row of a table in a selected database, for instance, the set of permissions can reduce the number of rows to access and thus the amount of data processing to perform.

In some embodiments, in response to determining that the complexity of specific exact aggregations or joins exceeds a threshold, the system is programmed to execute these database queries in a high-performance environment. For example, the high-performance environment can include a set of nodes that runs APACHE SPARK, which is a distributed processing system that optimizes query execution for fast analytic queries. In the absence of complex exact aggregations or joins, the system can be configured to execute the database queries in a regular environment. The system is programmed to subsequently receive a result from high-performance or regular environment, transform the result back to ontology data based on the transformations noted above, and return the ontology data in response to the ontology query.

The system disclosed herein has several technical benefits. An ontology provides a structure to any large volume of data, which facilitates user interaction with the data. By providing a unified interface for querying the ontology, the system allows a focus on the ontology without requiring knowledge of how ontology data is represented or where the ontology is stored. By automatically selecting appropriate databases for executing database queries derived from an ontology query, the system achieves improved performance from utilizing the most appropriate capabilities to serve the ontology query. By estimating the complexity of the database queries and selecting an appropriate execution environment accordingly, the system further improves performance from using the most powerful computing resources.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer server ("server") 102, one or more user devices 130, and one or more data sources 140, which are communicatively coupled through direct physical connections or via a network 118.

In some embodiments, the server 102 is programmed or configured to manage datasets representing data sources, which are transformed to ontology data, and databases representing the ontology data in multiple forms. The management comprises integrating multiple sources of change to the ontology data, representing changes to the ontology data in different forms, and allow access to the ontology data in various granularities. The server 102 can comprise any centralized or distributed computing facility with sufficient computing power in data processing, data storage, and network communication for performing the above-mentioned functions.

In some embodiments, each user device of the one or more user devices 130 is programmed to submit access requests to the server 102 to access the ontology and receive replies to the access requests from the server 102. The access requests can include reading, writing, adding, or deleting ontology data. Each user device can comprise a personal computing device, such as s desktop computer, laptop computer, tablet computer, smartphone, or wearable device.

In some embodiments, each data source of the one or more data sources 140 is programmed to provide original data to the server 102, which represents the original data as datasets, or accept changes to the original data based on updates to the datasets from the server 102. Each data source can generally be similar to the server 102 and comprise any computing facility with sufficient computing power in data processing, data storage, and network communication for performing the above-mentioned functions.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed or configured to receive original data from the one or more data sources 140. The server 102 is programmed to set up datasets representing the one or more data sources 140 and transforming data in the datasets to ontology data. The server 102 is programmed to further represent the ontology data in multiple databases. On the other hand, the server 102 is programmed to receive access requests from the one or more user devices 130, including user edits to the ontology data. The server 102 is programmed to also integrate these user edits into the multiple databases. The server 102 can also be programmed to materialize these user edits into datasets and transform data in these datasets for integrating into the datasets representing the one or more data sources 140 and ultimately updating the one or more data sources 140.

3. Functional Descriptions

Figure 2:
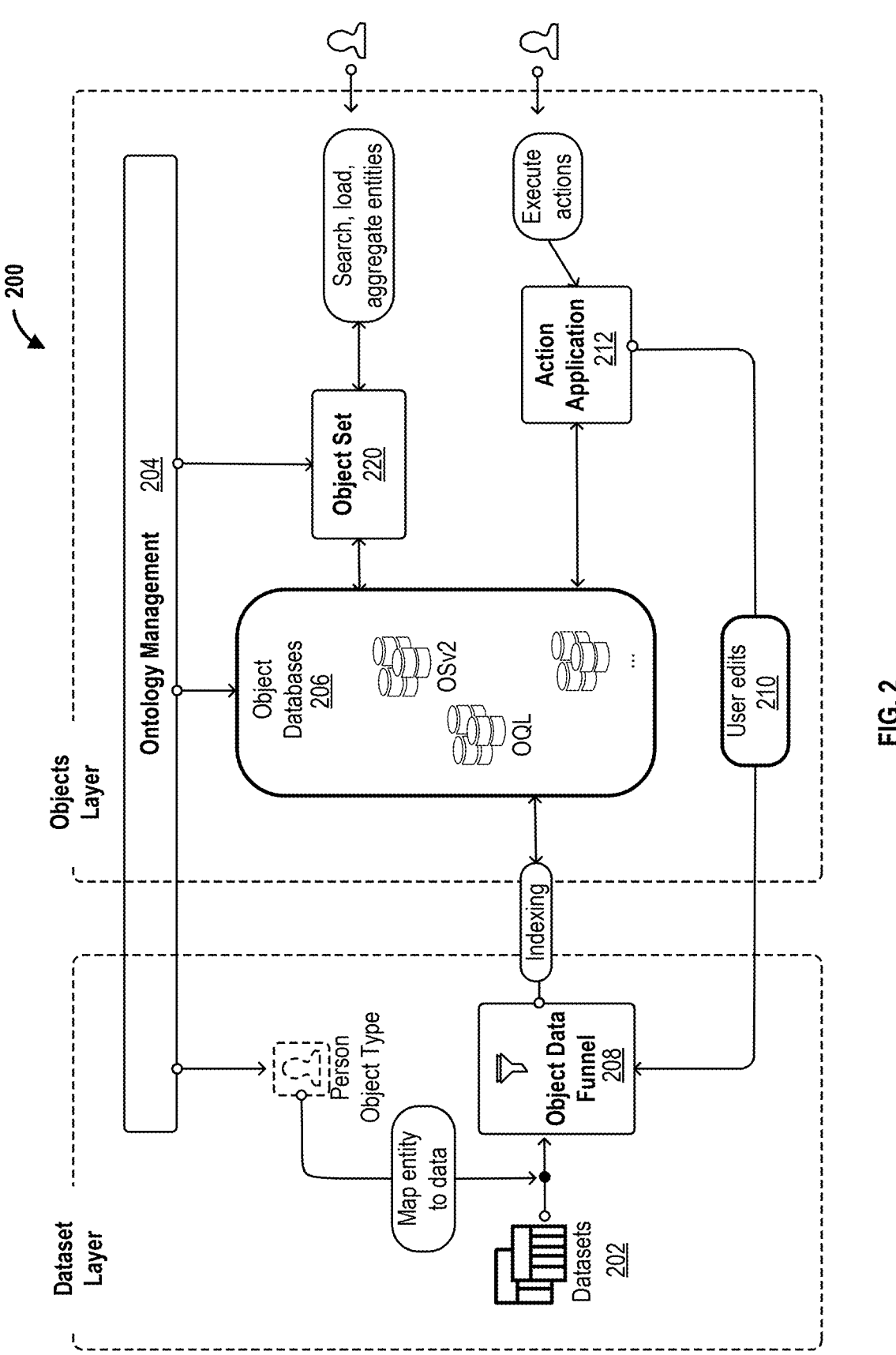
FIG. 2 illustrates an example set of components of and workflows managed by a computer application server ("server").

FIG. 2 illustrates an example set of components of and workflows managed by the server 102. In some embodiments, the server 102 is programmed to receive original data from various data sources and maintain them as datasets 202. The data sources can include file systems, database management systems, streaming sources, or blob stores, for example. A dataset is a wrapper around a collection of files which are stored in a specific file system. The datasets 202 can contain mainly structured and semi-structured data, from which one or more schemas can be inferred. Each schema specifies how a file is to be parsed into a specific format, such as a tabular format having rows and columns.

In some embodiments, the server 102 is programed to establish a mapping between the group of datasets and an ontology via the ontology management 204 as a service. The ontology includes definitions for all relevant object types, such as people, computers, networks, documents, or events, with objects being instantiated from the object types. The ontology can also separately include definitions for all relevant link types, such as similarities or dependencies, with links being instantiated from the link types. Specific structures, such as properties or versions, and specific operations, such as revision, access control, or provenance tracking at the object, link, or property level (or corresponding row or column level) apply to all object types and all link types. The object types and link types are considered as "ontology entity types". The objects and the links are considered as "ontology entities", which encompass the properties. The ontology and relevant metadata are considered as "ontology data". The ontology management 204 can manage definitions for an API that allows access to the ontology entities and the structures. The mapping between the group of datasets and the ontology would associate, for each dataset, one or more ontology entity types to which the dataset can be transformed. The server 102 can be further programmed to establish, for each dataset, a transformation between a schema for the dataset and definitions for the one or more ontology entity types to which the dataset is associated. For example, a column in the schema can be transformed to a property of an object type and vice versa. When more original data is received from the various data sources and maintained as updated datasets, any updates in the updated datasets can be readily converted to ontology data according to the transformation.

In some embodiments, the server 102 is programmed to store representations of ontology entity types and thus ontology entities in one or more ontology databases 206 (also called "object databases") via an ontology data funnel 208 (also called "object data funnel") as a service. The object data funnel 208 implements an indexing process of making the datasets as transformed to corresponding ontology data available in the object databases 206 for fast retrieval in response to user queries. The fast retrieval is achieved by the organization of the ontology, the representation of the ontology data in multiple object databases having different capabilities, and the availability of indices of ontology data and a mapping between the ontology and the object databases 206.

As links connect objects, link information could be considered as part of an object and vice versa. Therefore, representation of link types and that of object types can affect each other. In some embodiments, the server 102 is programmed to represent an object type or link type in different ways in different object databases in accordance with the different capabilities of the different object databases. As one example, in a relational object database, an object may be represented as a row while a property of an object may be represented as a column, which enables fast identification of objects that have certain property values. As another example, in a graph object database, an object may be represented as a node and a link between two objects may be represented as an edge, which enables fast exploration of relationships or links among objects. In other examples, the object databases can specialize in representing a property in a compressed form or an encrypted form, or representing properties in a specific order to form an index.

In some embodiments, the server 102 can be programmed to establish the mapping between the object databases and the ontology also via the ontology management 204. This mapping would associate, for each ontology entity type, one or more object databases to which the ontology entity type can be transformed. The server 102 can be further programmed to establish, for each ontology entity type, a transformation between a definition for the ontology entity type and one or more schemas for the one or more object databases to which the ontology entity type is associated. For example, a property of an object type can be transformed to a column in a schema and vice versa. Subsequently, any changes to the ontology can be readily converted to changes in the object databases 206 according to this transformation.

In some embodiments, the server 102 is programmed to represent each ontology entity type in at least one of the object databases 206, with the one being considered as the canonical object database for the ontology entity type. The server 102 can be programmed to also represent the ontology entity type in one or more secondary object databases. As changes are made to the ontology data, the indices could be updated as part of the indexing process implemented by the object data funnel 208. In addition, the server 102 can be programmed to represent each ontology entity in different versions in the object databases 206 and preserve versioning consistency across the object databases 206. The availability of a particular version in the canonical object database can be used to determine whether a particular version of an ontology entity is to be served in response to user queries.

In some embodiments, the server 102 is programmed to manage not only objects or links including components originating from only one data source but also objects including components originating from multiple data sources. Each ontology entity that originates from multiple data sources is referred to as a multi-data source ontology entity ("MDO"). An MDO typically has these components that correspond to respective data sources and are separately represented in the object databases 206. For example, separate components could be stored as separate columns in an object database. The server 102 can be further programmed to control access to the ontology data, from the ontology level down to the component level. Such access control can be extended to the object databases 206 where the ontology data are represented.

In some embodiments, the server 102 is programmed to receive queries from a user device associated with a user account and execute the query via the ontology set 220 (also called "object set") as a service. The object set 220 can support the API for querying the ontology noted above. The API would include a set of functions that operate on ontology entity types or ontology properties, such as filters or aggregators. These functions generally correspond to read requests to view ontology data, which require read access to the object databases 206. These functions can also be called to process ontology data before actions are applied, as discussed below. The actions correspond to write requests to modify ontology data, which require write access to the object databases 206.

In some embodiments, the server 102 is programmed to receive an action comprising user edits 210 to ontology data from a user device, and apply the action via the action application 212 as a service. In this ontology context, an action specifies user logic to change data related to one or more ontology entities and is to be performed as a single transaction. In other embodiments, the server 102 is programmed to receive updates to the datasets 202 from the data sources. As noted above, when such updates are received, they can be readily converted to corresponding changes to the ontology data according to the transformation.

In some embodiments, the server 102 is programmed to store representations of ontology data in the object databases 206 via the object data funnel 208, as discussed above. The object data funnel 208 can implement the indexing process by indexing only changes and sending the indexed changes to the object databases 206. As the changes can originate from the user edits 210 or data source updates (that turn into dataset updates), the server 102 can be programmed to resolve any conflicts in the received changes before indexing the changes and sending the indexed changes via the object data funnel 208 to the object databases 206.

3.1. Controlling Ontology Data Permissions

As discussed above, an ontology has objects and links, and each object or link has properties. In addition, each MDO has multiple components corresponding to multiple data sources, where each component includes properties that come from a single one of the multiple data sources. In certain embodiments, different components of an MDO include different properties, thus allowing no duplicity within the object.

In some embodiments, the server 102 is programmed to control access to the ontology at different levels, such as the ontology level, link type level, link level, object type level, object level, component level, or property level. The access control can be defined with respect to a hierarchy of user roles and a set of permissions or access levels.

In some embodiments, the server 102 is programmed to associate each data source with a set of user roles for users or user accounts and corresponding permissions. For example, an ontology owner role has full access including being able to manage permissions, an ontology editor role is less than the owner role by not being able to manage permissions, an ontology viewer role is less than the editor role by not having editing permissions, and an ontology discoverer role is less than the viewer role by only being to see select metadata. In general, each data source leads to a distinct set of object types and link types, and the access control of the data source can determine the access control of the distinct set of object types and link types. In the case of MDOs, multiple data sources lead to an ontology entity type, and the access controls of the data sources can determine the access controls of the multiple components of the ontology entity type. When MDOs are represented in the object databases, such as one with rows and columns, the access controls of the multiple components of each ontology entity type would correspond to column-level access controls.

In some embodiments, the server 102 is programmed to require having permissions to view an entire ontology entity to be able to modify the ontology entity. Therefore, when a user account is granted access by a first data source but not a second data source, the user account would not have access to modify an MDO that originates from both the first data source and the second data source.

In some embodiments, the server 102 is programmed to require permissions as follows for accessing objects of an object type, all properties of which originate from two data sources of D1 and D2. Creating an object of the object type by setting values for the properties that originate from D1 requires only permissions for viewing D1. The values for the properties that originate from D2 could be set to null. Similarly, modifying an object of the object type by setting values for the properties that originate from D1 requires only permissions for viewing D1. Deleting an object of the object type, however, requires permissions for viewing both D1 and D2.

In some embodiments, the server is programmed to require permissions as follows for accessing links of a link type that connects two object types. The first object type has all properties originating from D1, and the second object type has all properties originating from D2. Creating or deleting a link of the link type between a first object of the first object type and a second object of the second object type requires only permissions for viewing the first object and the second object.

In some embodiments, the server 102 is programmed to manage granular policies. With each data source leads to a distinct set of object types and link types, the access control of the data source can apply at not only these levels but also the object level, link level, object property level, or link property level with granular policies. A certain granular policy can restrict access to certain ontology entities to certain user accounts based on certain attribute values of the certain user accounts or certain properties of the certain ontology entities. As a result, only those user accounts having the certain attribute values and those ontology entities having the certain property values would meet the requirements of the certain granular policy, and only the certain user accounts would have access to the certain ontology entities or the certain properties of the certain ontology entities. For example, the certain granular policy can allow user accounts from Europe to see and edit European objects. When ontology entities are represented in the object databases, such as one with rows and columns, the access controls that apply at the ontology entity level would correspond to row-level access controls, and those that apply at the property level would correspond to column-level access controls.

Figure 3:
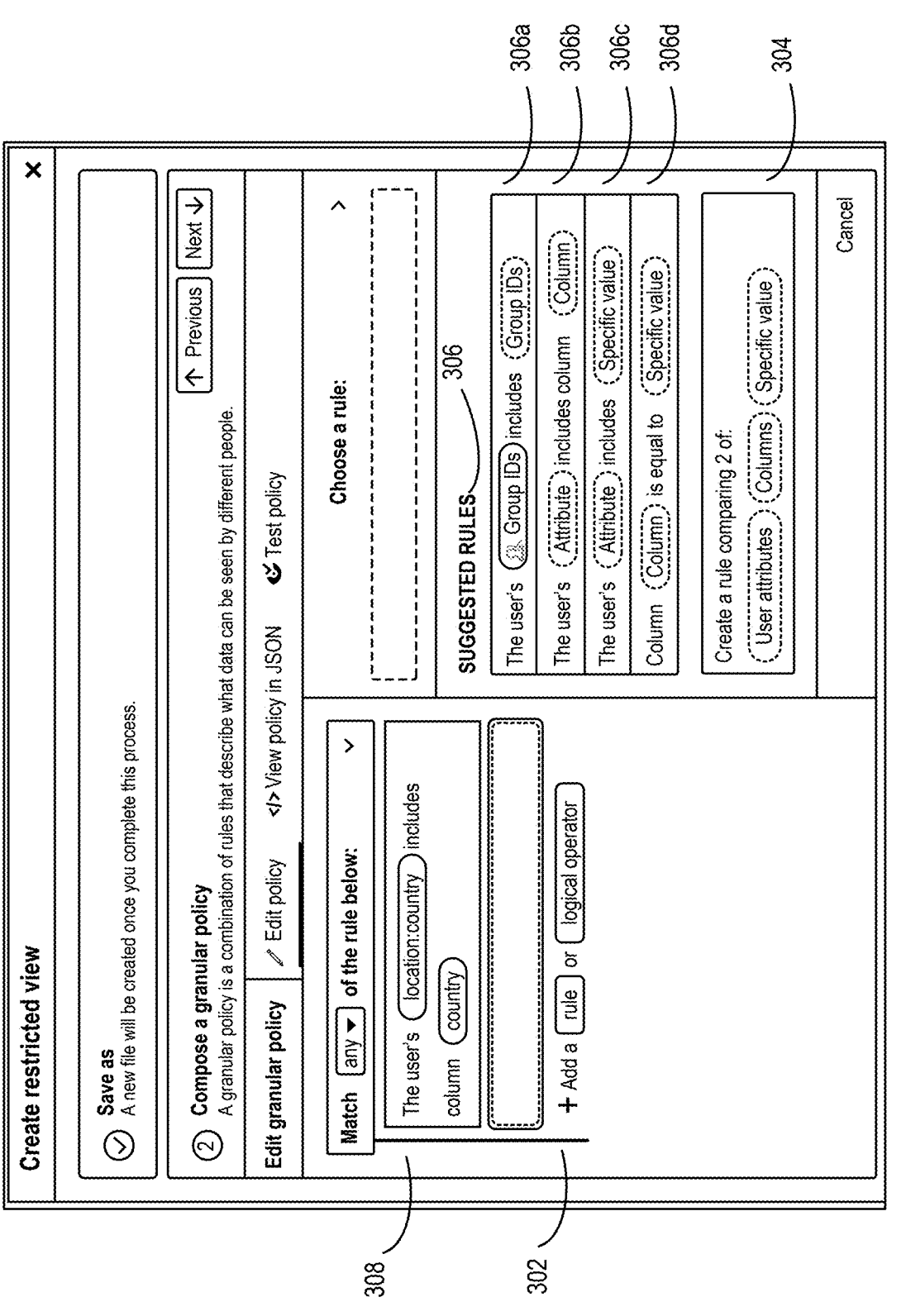
FIG. 3 illustrates an example graphical user interface for creating a granular policy.

FIG. 3 illustrates an example graphical user interface for creating a granular policy. In some embodiments, a granular policy can comprise one or more rules combined by logical operators. An administrator, such as a user in the ontology owner role, can add a rule or logical operator using the buttons in the area 302. For adding a rule, an initial mechanism of choosing two of three items for comparison can be employed in the area 304, and some sample comparisons are listed in the area 306. The initial mechanism allows three types of comparisons. The first type of comparison compares an attribute of a user account ("user attribute") with a specific value, and the rule 306c is an example. The second type of comparison compares a property of an ontology entity ("ontology entity property" corresponding to a column) with a specific value, and the rule 306d is an example. The third type of comparison compares a user attribute with an ontology entity property, and the rule 306a and the rule 306b are examples. The administrator can choose two of the three items in the area 304, specify a relational operator, such as "includes" or "is equal to", and obtain an initial rule, such as the rule 306b. The user can then instantiate each of the items, such as assigning "Group IDs" to the attribute item and "Group IDs" to the column item of the rule 306b, to get the final rule, such as the rule 306a, which indicates that the Group IDs user attribute includes a value that is not manually specified but comes from the "Group IDs ontology entity property.

In some embodiments, a final rule can then be displayed in the area 308, and it can be combined with existing rules using one or more logical operators, such as "any". The default access scope for a specific user in an appropriate user role when a rule is satisfied can be the objects that are compared in the rule or all objects otherwise. For example, the default access scope for the specific user from satisfying the rule 306a can be all objects where the Group IDs property match the Group IDs attribute of the specific user. The default access scope for the specific user from satisfying the rule 306c can be all objects. The default access scope for the specific user from satisfying the rule 306*d* can be all objects where the specified ontology entity property is equal to the specified value. The default access scope for satisfying a combination of rules can be the intersection of the access scopes of the matched rules. Additional elements can be included in the area 302, the area 304, or another area in the graphical user interface for specifying the access scope when each rule or the combination of rules is satisfied, which can be limited to specific properties of the objects. For example, a certain access scope can be defined to exclude from access those object properties that are being compared in the rules and the values thereof for users in roles that have editing permissions, to reduce disruptions to the application of the rules.

As discussed above, in some embodiments, the granular polices are applied on a per data source basis. The access controls associated with data sources can take precedence over those based on granular policies. For example, an object type might have two properties A and B that come from different data sources. For a specific user, the access controls associated with the data sources can determine that the ontology entity property B is inaccessible. When relevant granular policies are applied, only the ontology entity property A is then available for comparison, and the application result can be that only the ontology entity property A of certain objects are accessible. The presentation of the application result can depend on the exact user roles and permissions. When an ontology entity property is accessible, it can mean that only the metadata of the ontology entity property (e.g., identifier) is accessible, or both the metadata and actual value are accessible. Therefore, in the example, the metadata of the ontology entity property A would be shown and the value of this ontology entity property would be shown for the certain objects to the specific user. On the other hand, the metadata of the ontology entity property B can be shown with no value shown, or alternatively no information regarding the ontology entity property B would be shown depending on the user role of the specific user.

3.2. Providing a Unified Ontology Query Interface Across Multiple Object Databases In some embodiments, the server 102 is programmed to support an API for querying an ontology. The API includes a group of functions, such as filters or aggregators, which are typically predicated on ontology entity properties. Different properties can support the same function. Certain functions apply to specific property types, such as a string or a number, and thus all properties of that property type across ontology entity types. Some functions apply to specific ontology entity types and thus additional ontology entity types that derive from the specific ontology entity types. The applicability of each function or other relevant information regarding the function can be recorded as metadata of the function. The API can enable the generation of an ontology entity set, such as an object set, through the use of filters. Each filter generally takes as an input a criterion to be satisfied by a property, thus filtering out those ontology entities having that property that does not satisfy the criterion. Each filter can also simply take a list of identifiers of ontology entities for retrieving the set of ontology entities identified by the list of identifiers. The API can also enable the generation of specific values through the use of aggregators. Each aggregator can be directly predicated on a property across all ontology entities or, after the property values are grouped into buckets, across all ontology entities in each bucket. Example aggregators include count( ), average( ), min( ), or max( ). Example grouping operators include top Values( ) to extract the top values of the property or by Year to group the property values by year.

As discussed above, each ontology entity type can be mapped to multiple object databases, where ontology entities of the ontology entity type are represented. Ontology entities of the ontology entity type can be represented in different ways in different object databases. As one example, in one object database, ontology data can be represented in an object-centric manner, while in another object database, links can also be represented as first-class citizens. As another example, in one object database, certain properties of the ontology entity type can be stored in a compressed form and thus generally unavailable for querying, while in another object database, some properties of the ontology entity type can all be stored as strings that are suitable for specific operations and thus can be operated on by specific functions.

In some embodiments, the server 102 is programmed to associate each object database with functional information that can be matched with metadata of the functions in the API for querying the ontology. As different functions can apply at different granularities, the functional information can be recorded at different granularities according to the mapping between ontology entity types and object databases. As one example, when an object database represents objects of an object type as rows and properties as columns, certain columns may be associated with functional information, which can be part of the column's metadata, such as that a column is of a specific data type, is compressed or otherwise not suitable for querying, or has corresponding indices. As another example, when an object database represents links of a link type as edges between nodes, the edges can be associated with functional information, which can be part of the edge's metadata, such as that an edge represents a link that can be directly queried.

In some embodiments, when a function is called, the server 102 is configured to determine which object databases to access to execute the function efficiently. The determination can depend on the ontology entity type on which the function is called, the nature of the function, or other factors, as further discussed below. The server 102 can be programmed to determine an ontology entity type on which the function operates or which the function takes as an input as part of the conventional process of executing a function. The server 102 can be programmed to further identify the set of object databases with which the ontology entity type is associated according to an existing mapping, and select at least one from the set of object databases to access.

In some embodiments, the server 102 can be programmed to perform the selection by matching the function's metadata with the functional information associated with the set of object databases, as discussed above and illustrated below. The server 102 can be programmed to perform the selection by further estimating the performance of the set of object databases in executing the function. The estimation can be performed by partially or selectively executing the function. For example, while the function is to obtain an aggregation over each of five groups, the estimation can be performed by obtaining an aggregation over one of the five groups. The server 102 can also be programmed to perform the selection according to a predetermined list of priorities assigned to the set of object databases. The assignment can be performed based on the number of properties the representation of which is suitable for querying in an object database, the number of properties that are indexed in an object database, the historical frequency of use for an object database, or other factors. In other embodiments, the server 102 can be programmed to perform the selection by considering multiple functions simultaneously. For example, an object database can serve multiple functions being called can be preferred to another object database that can serve only one of the functions being called based on reduced overhead associated with database access.

In some embodiments, upon selecting an object database, the server 102 is programmed to access the object database and retrieve a piece of data in executing the function based on the transformation from the definition for the ontology entity type on which the function is called to the schema for the object database. Depending on the nature of the function, the server 102 can be programmed to retrieve one or more pieces of data from one or more object databases in executing the function. The server 102 is further programmed to transform the combination of the one or more pieces of data back into ontology data in response to the function call. When the retrieval is unsuccessful, the server 102 can be programmed to re-select another object database from the set of object databases.

FIG. 4 illustrates examples calls to the API for querying an ontology. In the set of function 402, the Objects.search( ) function in the API can be used to specify a query. The invocation of this function is followed by the invocation of a function that corresponds to an ontology entity type, such as a flight object type that corresponds to a flight, to specify the return type of the query. All ontology entity types can support the filter( ) function that implements a filter, which means that the filter( ) function can operate on all ontology entity types. The flight object type has a property of departureAirportCode, which corresponds to the departure airport code of a flight. All properties can support the exactMatch( ) function as one of the matching functions. The exactMatch( ) function thus operates on a property of an ontology entity and takes a value or anther property as an input. Therefore, in the set of function 402, the filter( ) function is requesting the set of flight objects, where the departureAirportCode has a value of airportCode, to look for the set of flights that depart from the airport having an airport code of airportCode. The searchAround functionality enables traversing links, and a corresponding function can be created for each link type. A flight object type can be linked to a passenger object type that corresponds to a passenger of the flight. The searchAroundPassengers( ) function thus operates on an ontology entity type that has links to the passenger object type and, when invoked on a flight object, finds all the passenger objects linked to the flight object. Therefore, calls of the set of function 402 returns the set of passenger objects that are linked to the set of flight objects returned by the filter( ) function, that correspond to the set of passengers of these flights.

In some embodiments, to execute the set of functions 402, the server 102 is programmed to first identify the set of flight objects that satisfy the filter criterion and then identify the set of passenger objects that are linked to the set of flight objects. For the first identification, the exactMatch( ) function operates on or takes as an input a property value. The server 102 can thus be programmed to determine an object database for the flight object type that enables fast retrieval based on a particular property value of an object. The server 102 can be further programmed to detect that a particular object database is a relational database that has an index on the column representing the departureAirportCode property and select the particular object database. For the second identification, the searchAround functionality operates on links. The server 102 can thus be programmed to determine an object database for the flight object type that allows efficient traversal of links connecting flight objects with passenger objects. The server 102 can be programmed to detect that a certain object database is a graph database that represents links between flight objects and passenger objects as edges and select the certain object database. Finally, in response to the set of function calls 402, the server 102 is configured to return the result of the second identification.

In the set of function 404, the Objects.search( ) and filter ( ) functions in the API to query the ontology have been discussed above. The building object type has a property of maxOccupancy, which corresponds to the maximum occupancy of the building, and a property of inFloodZone, which corresponds to an indication of whether the building is in a flood zone. The Filters.and( ) function in the API can be used to combine filters using the and logical operator, which takes two Boolean expressions as inputs. In this case, the first Boolean expression is building.maxOccupancy.gt(100) to indicate whether the building's maximum occupancy is greater than 100 people. The second Boolean expression is building.inFloodZone.isTrue( ), which indicates whether the building is in a flood zone. Therefore, the set of function 404 returns the set of building objects that are returned by the filter( ) function.

In some embodiments, to execute the set of functions 404, the server 102 is programmed to identify the set of building objects that satisfy the filter criterion, which is a combination of two filter criteria. The two filter criteria involve different functions, but both gt( ) and isTrue( ) operate on or take as an input a property value. The two filter criteria can lead to access to different object databases even if they apply to the same building object type. In this case, the maxOccupancy property can be a property that is specific to the building object type or is commonly accessed, while the inFloodZone can be a property that is inherited from a related ontology entity type, such as a geoArea object type, and not commonly accessed. Furthermore, a first object database can store a subset of the properties of building objects that are commonly accessed in uncompressed form in hot storage and the remaining properties in archived form in cold storage. A second object database can be created to specifically serve geospatial queries and have specific indices for relevant properties, including the inFloodZone property of the building objects. The server 102 is thus programmed to detect that the maxOccupancy property can be efficiently queried in the first object database and select that object database to acquire a first set of building objects that satisfy the first filter criterion. The server 102 is programmed to then detect that the inFloodZone property can be efficiently queried in the second object database and select that object database to acquire a second set of building objects that satisfy the second filter criterion. Finally, in response to the set of function 404, the server 102 is configured to return the intersection of the first set of building objects and the second set of building objects.

In some embodiments, in executing a function call, the server 102 is programmed to consider data availability in an object database, which can vary depending on the versioning strategy. The function calls discussed herein would correspond to the read requests discussed above. Sometimes, the versioning strategy allows a latest version of an ontology entity of an ontology entity type to be accessed even when the latest version is not yet represented in all the object databases associated with the ontology entity type. The server 102 thus can be programmed to track the list of object databases where the latest version is available, which limits the choices of object databases in executing a function all.

In some embodiments, in executing a function call, the server 102 is programmed to also consider data access control in the ontology, which can vary depending on properties of ontology entities and attributes of user accounts, as discussed in Section 3.1. The server 102 is programmed to determine whether the user accounts instructing executing the function has permission to access each ontology entity on which the function operates, and such permission would generally apply to all the object databases associated with the corresponding ontology entity type. In certain embodiments, the functions themselves can be associated with access control, so permissions can be determined before a function is applied to any ontology entity type. For example, access to fuzzy filters that allow fuzzy matching could be granted to only user accounts that are associated with more than a certain amount of experience, regardless of which ontology entities are to be fuzzy matched. Among the set of user accounts that are allowed to use the fuzzy filters, granular security policies can then further determine which user accounts can have read or view access to the ontology entities being fuzzy matched. Generally, any portion of an ontology entity that is not accessible to a user account becomes a null value to the user account.

3.3. Routing Complex Queries to High-Performance Nodes

3.3.1. Initial Processing of Ontology Queries

In some embodiments, the server 102 is programmed to receive a query of an ontology from a user device, as discussed above. The ontology query can include one or more calls of functions in the API of the ontology. The server 102 is programmed to then plan the execution of the ontology query, starting with selecting an object database from one or more object databases for each ontology entity type covered by the ontology query. In certain embodiments, the server 102 can be programmed to minimize the total number of object databases selected for the ontology entity types covered by the ontology query. For a given object database, the server 102 can be programmed to then determine how the ontology query is translated to database queries or operations. The determination can be made based on the mapping between the ontology entity types and the plurality of object databases, including a transformation between the definition for an ontology entity type and the schemas for the corresponding object databases.

As discussed above, the API includes aggregators each directly predicated on a property of an ontology entity type across all ontology entities of the ontology entity type or, after the property values are grouped into buckets, across all ontology entities of the ontology entity type in each bucket. When the selected object database has tables of rows and columns, for example, such an aggregator (together with a related grouping function) can correspond to aggregating values in a column of a table. The API also includes functions that can be invoked on different ontology entity types, which when called together would lead the exploration of ontology entities of multiple ontology entity types. When the selected object database is the same for the multiple ontology entity types and has tables of rows and columns, for example, these functions can lead to joining two tables. The API also includes the searchAround functionality, which leads to various functions specific to respective ontology entity types, that enables traversing links between objects. When the selected object database has tables of rows and columns, for example, such a searchAround-based function can also lead to joining two tables. For example, the searchAroundPassengers( ) function when invoked on a set of flight objects, can be used to find a relationship between the passenger objects linked to the set of flight objects and specific information of the set of flight objects, such as the arrival city. The function can thus lead to a join in the selected object database between a flight table representing all flight objects with the specific information of interest and a passenger table representing all passenger objects based on the flight identifier property.

In some embodiments, the server 102 is programmed to identify a set of permissions for a user account associated with the user device and execute the ontology query subject to the set of permissions. As discussed above, there can be granular security policies that determine which properties of each ontology entity can be accessed by the user account and what types of access are granted to the user account, based on attributes of the user account. The set of permissions can then affect whether and how specific database queries can be executed. For example, to execute an ontology query that calls the searchAroundPassengers( ) function on a set of flight objects can require that the user account be able to execute the ontology query or the searchAroundPassengers ( ) function and view the portions of the selected object database that represent the flight objects and the passenger objects, such as the flight table and the passenger table or specific rows or columns therein.

In some embodiments, the server 102 is programmed to work with a distributed environment for query execution. The distributed environment can include a specific set of nodes that is configured for performing efficient and scalable data processing ("power nodes"). For example, the specific set of power nodes can run APACHE SPARK, which is a distributed processing system that supports data parallelism and fault tolerance, uses in-memory caching, and optimizes query execution for fast analytic queries. The server 102 can thus be configured to execute complex database queries via the specific set of power nodes for improved performance instead of executing those database queries via a single node or other nodes outside the specific set of power nodes.

In some embodiments, the server 102 is programmed to determine, when the ontology query leads to aggregations and joins, whether the execution will significantly benefit from the set of nodes configured for performing efficient and scalable data processing. In response to a positive determination, the server 102 can be programmed to route complex database queries related to the aggregations or joins to the specific set of power nodes, which can be programmed to retrieve data from the object databases, perform appropriate data processing operations on the retrieved data, and return the results.

3.3.2. Identifying Large-Scale, Exact Aggregations

In some embodiments, the server 102 is programmed to determine whether the ontology query leads to large-scale, exact aggregations. As noted above, an ontology query can first call a grouping function to group property values into groups or buckets, and then computing an aggregate value for each bucket. An example aggregation corresponds to grouping the car objects having the property value of being located in a town by the color property, computing the number of such car objects for each value of the color property, and returning the top three numbers, which translates to identifying the three most common colors for cars in the town and computing the number of such cars in each of those three colors. For such an aggregation, the requested number of buckets is less than the total number of buckets. When the computation is first distributed among a plurality of nodes and the computation results are then merged by a particular node, to compute those numbers precisely, it might not suffice for each of the plurality of nodes to return the values only for the requested number of buckets based on its local computation. FIG. 5A illustrates an example scenario for computing aggregations. In this example, the cars in the town are in five colors in total. The computation is split between two nodes. As a result, the first node is configured to generate five numbers and return only 80, 60, and 38 for red, green, and yellow; the second node is configured to similarly generate five numbers and return 100, 90, and 50 for red, green, and black. The accumulator node is configured to then compute the sum of these numbers and determine that the top three colors in the global state are red, green, and black, while they are in fact red, green, and purple. Therefore, for aggregations, the server 102 can be programmed to offer a first option of exact computation associated with a higher utilization of computing resources and a second option of inexact computation associated with lower utilization of computing resources. For exact aggregations, each node could be configured to return the values for more buckets than the number of requested buckets for the final aggregation based on the local computation.

In some embodiments, to access the complexity of the exact aggregations, the server 102 is programmed to consider the total number of buckets available B (e.g., five colors in the example above), as each node involved in the computation would perform one aggregation for each of B buckets, the number of requested buckets R<=B (e.g., three colors in the example above), as each node would transmit R aggregated values, or the number of nodes performing the distributed computation U, which affects the number of aggregated values transmitted to and aggregated by the accumulator node. The server 102 can also be configured to consider the size of each property value being aggregated S (e.g., a representation of a number up to 200 in the example above), which affects the performance of each aggregation, transmission, or storage. The server 102 can be programmed to set a threshold for each of these parameters and deem the exact aggregations as large-scale exact aggregations and thus pursue execution via the specific set of power nodes when any of the thresholds is exceeded. The server 102 can also be programmed to set a separate threshold for a combination of these parameters, such as R*U*S, and deem the exact aggregations as large-scale exact aggregations and thus pursue execution via the specific set of power nodes when the separate thresholds is exceeded.

In some embodiments, the server 102 is programmed to also consider the number of property values to be aggregated N (or to be sorted when no appropriate indices on the property on which groups are formed are available). This number would depend on the number of ontology entities covered by the ontology query (e.g., total number of car objects in the town in the example above) and the set of permissions for the user account submitting the ontology query. When the user account does not have permission to access the property of an ontology entity on which an aggregator is predicated, the number of property values to be aggregated is reduced. The server 102 can be programmed to similarly set a threshold for N alone or in combination with the other parameters.

In some embodiments, the server 102 is programmed to obtain the number of ontology entities covered by the ontology query generally from ontology metadata or database metadata. For example, when the car objects having the property value of being located in a town and no other town are represented in one table, the number of rows in the table, which would correspond to the number of ontology entities covered by the ontology query, can be part of the database metadata. When car objects having the property value of being located in any of multiple towns are represented in one table, some filtering would be performed. Any index available on the town information, which could be used to obtain the number of ontology entities covered by the ontology query, can also be part of the database metadata. In the absence of indices, the server 102 can be programmed to estimate the number of ontology entities covered by the ontology query using existing sampling techniques. For example, the number of ontology entities covered by the ontology query in all the buckets can be estimated from that in one of the buckets, a predetermined set of representative samples, or a set of random samples (e.g., data stored in one out of five shards).

In some embodiments, the server 102 can be programmed to precisely determine the impact of the set of permissions for the user account when the amount of computation required for the determination is limited. For example, when the set of permissions includes a relatively small number of rules the scope of which is easily ascertainable or already computed, such as a rule prohibiting the user account from accessing car objects having the property value of having a specific color, the number of affected ontology entities can be computed quickly and precisely. The server 102 can be programmed to estimate the impact of the set of permissions for the user account when the amount of computation required for the determination is beyond a threshold, such as a certain number of table lookups or joins. The estimate could be obtained using existing sampling techniques. For example, the number of ontology entities not accessible to the user account in all the buckets can be estimated from that in one of the buckets, a predetermined set of representative samples, or a set of random samples.

3.3.3. Identifying Deep Joins

In some embodiments, the server 102 is programmed to determine whether the ontology query leads to deep joins. An example join is identifying values of the phone number property of a first set of person objects connected to a second set of person objects via family member links, which are connected to particular flight objects having the property value of arriving in a particular city via passenger links, which translates to finding the phone numbers of the family members of passengers of particular flights arriving in a particular city. FIG. 5B illustrates an example scenario for computing joins. When a flight object type is represented in a flight table having the flight identifier and destination columns, when a passenger relationship link type is represented in a passenger table having a flight identifier and a person identifier column corresponding to a passenger of a flight, when a family member relationship link type is represented in a family table having a family relationship identifier and two person identifier columns corresponding to two persons having a particular family relationship, and when a person object type is represented in a person table having the person identifier and phone number columns, the example would involve joining the four tables together. Similar to the computation of exact aggregations, the computation of joins can first be distributed among a plurality of nodes and then the computation results can be merged by a particular node.

In some embodiments, to access the complexity of the joins, the server 102 is programmed to consider the total number of joins to perform J, as the nodes involved in the computation would perform these J joins and transmit as many as J joined values. This number would depend on the numbers of ontology entities covered by the ontology query and the set of permissions for the user account submitting the ontology query. When the user account does not have permission to access any property of an ontology entity that is referenced in a join, the number of joins to be performed is reduced.

In some embodiments, the server 102 is programmed to obtain the numbers of ontology entities covered by the ontology query generally from ontology metadata or database metadata. In the example illustrated in FIG. 5B, the numbers of ontology entities covered by the ontology query would be bound by the numbers of rows in the flight, family, passenger, and person tables, which can be part of the database metadata. In this example, in addition to the joins, some filtering would be performed based on the destination information of a flight object type and the phone number information of the person object type. Any index available for either type of information, which could be used to adjust a corresponding number of ontology entities covered by the ontology query, can also be part of the database metadata. In the absence of indices, the server 102 can be programmed to estimate the number of ontology entities covered by the ontology query using existing sampling techniques. For example, the number can be estimated from a predetermined set of representative samples or a set of random samples.

In some embodiments, the server 102 can be programmed to precisely determine the impact of the set of permissions for the user account when the amount of computation required for the determination is limited. For example, when the set of permissions includes a relatively small number of rules the scope of which is easily ascertainable or already computed, such as prohibiting the user account from accessing flight objects having the property value of departing from or arriving in a particular city, the number of affected ontology entities can be computed quickly and precisely. The server 102 can be programmed to estimate the impact of the set of permissions for the user account when the amount of computation required for the determination is beyond a threshold. The estimate could be obtained using existing sampling techniques, such as from a predetermined set of representative samples or a set of random samples.

In some embodiments, the server 102 can also be configured to consider the total size of the property values being joined Z (e.g., a part of a row in the person table that includes a name and a phone number in the example above), which affects the performance of each join, transmission, and storage. The server 102 can be programmed to set a threshold for each of these parameters and deem the joins as deep joins and thus pursue execution via the specific set of power nodes when any of the thresholds is exceeded. The server 102 can also be programmed to set a separate threshold for a combination of these parameters, such as J*Z, and deem the joins as deep joins and thus pursue execution via the specific set of power nodes when the separate thresholds is exceeded.

3.3.4. Following Query Execution Strategies

In some embodiments, the server 102 is programmed to follow an execution strategy for executing the ontology query. In a first option for an execution strategy, the server 102 is configured to first determine whether the ontology query leads to large-scale aggregations or deep joins, as discussed above. In response to a positive determination, the server 102 is programmed to then route the corresponding database queries to the specific set of power nodes for query execution. In response to a negative determination, the server 102 is programmed to bypass such routing for query execution.

In a second option for an execution strategy, the server 102 is programmed to initially execute the ontology query outside the specific set of power nodes. When such execution leads to an exception, the server 102 is programmed to then route the corresponding database queries to the specific set of power nodes. One exception can be that a predetermined amount of time has passed, suggesting that the query execution has taken longer than expected or permitted. Another exception can be that a chance of error has arisen. For an exact aggregation, each node can be configured to return a number of aggregated values that is greater than the requested number of buckets but still less than the total number of buckets, which can still be associated with a risk of inexact aggregation. FIG. 5C illustrates another example of computing aggregations. In this example, instead of five colors, there can be ten colors instead. Instead of returning values for all ten colors, each node could be configured to return the values for the top five colors, which is greater than the requested top three colors. In this example, the accumulator node can be configured to determine that even if each node is to return additional values, the top three colors and their corresponding numbers are not going to change. Without being able to make such a determination, the server 102 can be programmed to then identify a chance of error and route the database queries to the specific set of power nodes.

4. Example Processes

FIG. 6 illustrates a process of efficient query execution over ontology-based databases in accordance with disclosed embodiments. FIG. 6 is shown in simplified, schematic format for purposes of illustrating a clear example and other embodiments may include more, fewer, or different elements connected in various manners. FIG. 6 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 602, the server 102 is programmed or configured to receive an ontology query for querying an ontology from a user device. The ontology includes a definition for each ontology entity type of a plurality of ontology entity types and a plurality of ontology entities instantiated from the plurality of ontology entity types. Each ontology entity type of the plurality of ontology entity types has one or more properties.

In step 604, the server 102 is programmed or configured to identify a set of permissions for accessing the ontology associated with a user account of the user device. In some embodiments, the set of permissions indicates whether the user account has a specific type of access to an ontology entity type, an ontology entity, or a property of an ontology entity.

In step 606, the server 102 is programmed or configured to transform the ontology query to a set of database queries, including a set of joins or aggregations. In some embodiments, as part of the transforming, the server 102 is programmed to receive a confirmation of exact computation for an aggregation of the set of joins or aggregations.

In step 608, the server 102 is programmed or configured to determine whether the set of joins or aggregations meets any condition of a set of conditions based on the set of permissions. In certain embodiments, as part of the determining, the server 102 is programmed to estimate an amount of data processing to be performed on data accessible to the user account based on the set of permissions, and evaluate whether the amount of data processing exceeds a threshold.

In certain embodiments, the set of joins or aggregations includes an aggregation over each group of ontology entities of one or more groups of ontology entities of a specific ontology type. The set of conditions is then related to a number of groups of the one or more groups, a number of ontology entities of the specific ontology type, or a size of a value being aggregated.

In other embodiments, the set of joins or aggregations includes a join of one or more specific properties of two or more specific ontology entity types. The set of conditions is then related to a number of ontology entities of the two or more specific ontology entity types or a size of the one or more specific properties.

In step 610, the server 102 is programmed or configured to route, in response to determining that the set of joins or aggregations meets a condition of the set of conditions, the set of joins or aggregations to a specific set of computing nodes. In some embodiments, the specific set of computing nodes has a high-performance, scalable architecture.

In step 612, the server 102 is programmed or configured to receive a reply from the specific set of computing nodes.

In step 614, the server 102 is programmed or configured to transmit a result based on the reply to the user device in response to the ontology query. In some embodiments, a specific ontology entity type covered by the ontology query is represented in multiple forms in a plurality of object databases. As part of the transforming, the server 102 is programmed to select one or more object databases from the plurality of object databases for a set of ontology entity types covered by the ontology query. As part of the transmitting, the server 102 is programmed to convert the reply into one or more ontology entities based on one or more transformations between a set of definitions for the set of ontology entity types covered by the ontology query and one or more schemas for the one or more object databases.

In some embodiments, the server 102 is programmed to route, in response to determining that the set of joins or aggregations does not meet any condition of the set of conditions, the set of joins or aggregations to a distributed environment outside the specific set of computing nodes.

In certain embodiments, the server 102 is programmed to receive a second ontology query from the user device, and transform the second ontology query to a second set of database queries, including a second set of joins or aggregations. The server 102 is programmed to then route the set of joins or aggregations to a distributed environment outside the specific set of computing nodes. Furthermore, the server 102 is programmed to detect an exception in executing the set of joins or aggregations in the distributed environment, and route, in response to the detecting, the set of joins or aggregations to the specific set of computing nodes. In specific embodiments, the exception indicates that a certain amount of time has passed since a start of the executing without reaching an end of the executing.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
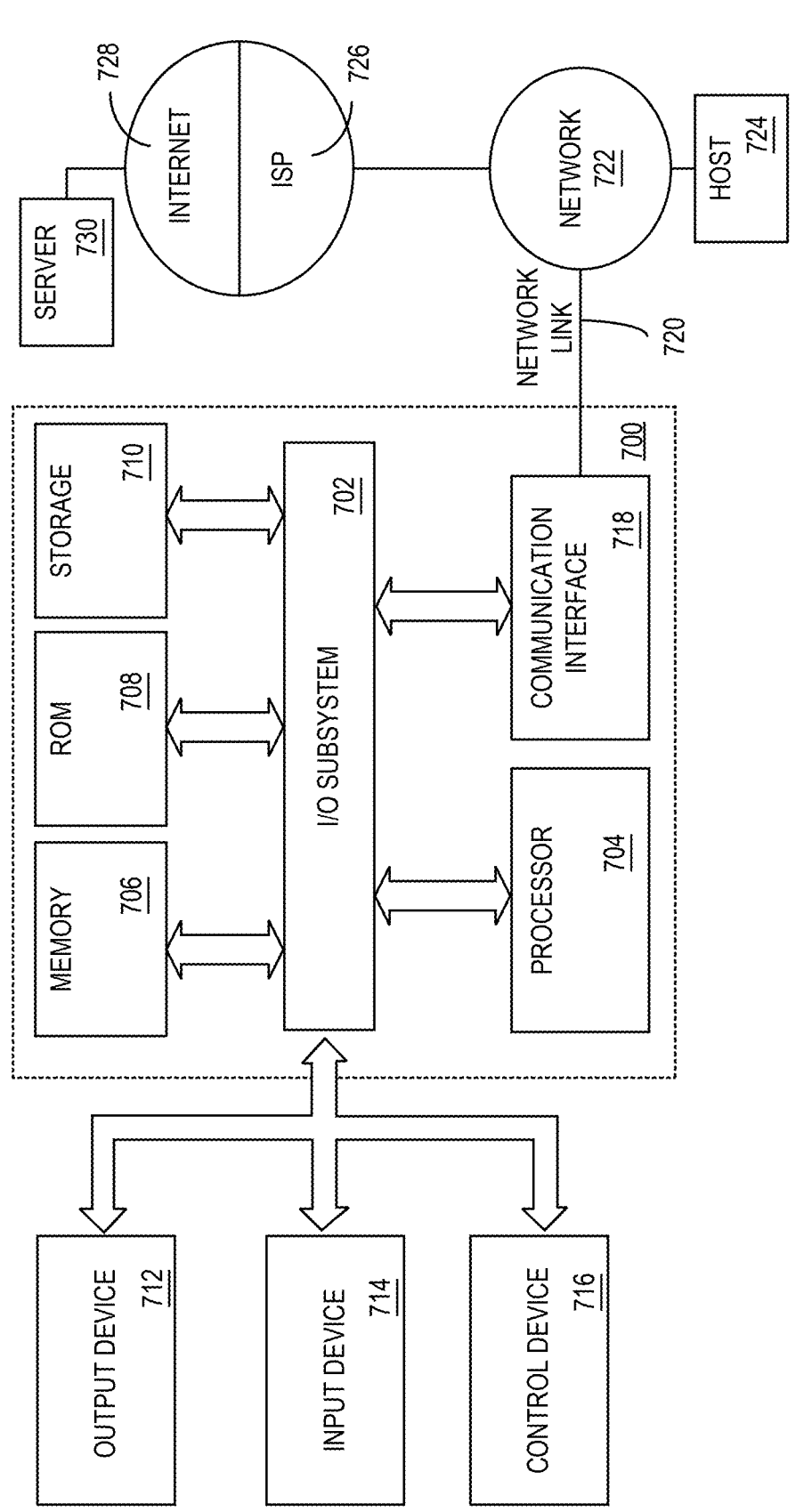
FIG. 7 illustrates a computer system upon which various embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or Advanced RISC Machines (ARM) processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as flash memory, or solid-state storage, magnetic disk, or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on the output device 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to I/O subsystem 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a LAN, WAN, campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, Uniform Resource Locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using SQL or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of efficient query execution over ontology-based databases, comprising:
receiving an ontology query for querying an ontology from a user device,
the ontology including a definition for each ontology entity type of a plurality of ontology entity types and a plurality of ontology entities instantiated from the plurality of ontology entity types,
each ontology entity type of the plurality of ontology entity types having one or more properties;
identifying a set of permissions of a user account of the user device for accessing the ontology;
transforming the ontology query to a set of database queries, including a set of joins or aggregations;
determining whether execution of the set of joins or aggregations based on the set of permissions meets any condition of a set of conditions;
routing, in response to determining that the set of joins or aggregations meets a condition of the set of conditions, the set of joins or aggregations to a specific set of computing nodes;
receiving a reply from the specific set of computing nodes;
transmitting a result based on the reply to the user device in response to the ontology query,
wherein the method is performed by one or more processors.
2. The computer-implemented method of claim 1, the set of permissions indicating whether the user account has a specific type of access to an ontology entity type, an ontology entity, or a property of an ontology entity.

3. The computer-implemented method of claim 1,
a specific ontology entity type covered by the ontology query being represented in multiple forms in a plurality of object databases,
the transforming comprising selecting one or more object databases from the plurality of object databases for a set of ontology entity types covered by the ontology query.
4. The computer-implemented method of claim 3, the transmitting comprising converting the reply into one or more ontology entities based on one or more transformations between a set of definitions for the set of ontology entity types covered by the ontology query and one or more schemas for the one or more object databases.
5. The computer-implemented method of claim 1, the transforming comprising receiving a confirmation of exact computation for an aggregation of the set of joins or aggregations.
6. The computer-implemented method of claim 1,
the set of joins or aggregations including an aggregation over each group of ontology entities of one or more groups of ontology entities of a specific ontology type,
the set of conditions being related to a number of groups of the one or more groups, a number of ontology entities of the specific ontology type, or a size of a value being aggregated.
7. The computer-implemented method of claim 1,
the set of joins or aggregations including a join of one or more specific properties of two or more specific ontology entity types,
the set of conditions being related to a number of ontology entities of the two or more specific ontology entity types or a size of the one or more specific properties.
8. The computer-implemented method of claim 1, the determining comprising:
estimating an amount of data processing to be performed on data accessible to the user account based on the set of permissions;
evaluating whether the amount of data processing exceeds a threshold.
9. The computer-implemented method of claim 1, the specific set of computing nodes having a high-performance, scalable architecture.
10. The computer-implemented method of claim 1, further comprising:
receiving a second ontology query from the user device,
transforming the second ontology query to a second set of database queries, including a second set of joins or aggregations;
routing the set of joins or aggregations to a distributed environment outside the specific set of computing nodes;
detecting an exception in executing the set of joins or aggregations in the distributed environment;
routing, in response to the detecting, the set of joins or aggregations to the specific set of computing nodes.
11. The computer-implemented method of claim 10, the exception indicating that a certain amount of time has passed since a start of the executing without reaching an end of the executing.
12. The computer-implemented method of claim 1, further comprising routing, in response to determining that the set of joins or aggregations does not meet any condition of the set of conditions, the set of joins or aggregations to a distributed environment outside the specific set of computing nodes.

13. A system for efficient query execution over ontology-based databases, comprising:

a memory;

one or more processors coupled to the memory and configured to perform:

receiving an ontology query for querying an ontology from a user device, the ontology including a definition for each ontology entity type of a plurality of ontology entity types and a plurality of ontology entities instantiated from the plurality of ontology entity types, each ontology entity type of the plurality of ontology entity types having one or more properties;

identifying a set of permissions of a user account of the user device for accessing the ontology;

transforming the ontology query to a set of database queries, including a set of joins or aggregations;

determining whether execution of the set of joins or aggregations based on the set of permissions meets any condition of a set of conditions;

routing, in response to determining that the set of joins or aggregations meets a condition of the set of conditions, the set of joins or aggregations to a specific set of computing nodes;

receiving a reply from the specific set of computing nodes;

transmitting a result based on the reply to the user device in response to the ontology query.

14. The system of claim 13, a specific ontology entity type covered by the ontology query being represented in multiple forms in a plurality of object databases, the transforming comprising selecting one or more object databases from the plurality of object databases for a set of ontology entity types covered by the ontology query.

15. The system of claim 13, the set of joins or aggregations including an aggregation over each group of ontology entities of one or more groups of ontology entities of a specific ontology type, the set of conditions being related to a number of groups of the one or more groups, a number of ontology entities of the specific ontology type, or a size of a value being aggregated.

16. The system of claim 13, the set of joins or aggregations including a join of one or more specific properties of two or more specific ontology entity types, the set of conditions being related to a number of ontology entities of the two or more specific ontology entity types or a size of the one or more specific properties.

17. The system of claim 13, the determining comprising:

estimating a number of data processing steps to be performed on data accessible to the user account based on the set of permissions;

evaluating whether the number of data processing steps exceeds a threshold.

18. The system of claim 13, the one or more processors further configured to perform:

receiving a second ontology query from the user device, transforming the second ontology query to a second set of database queries, including a second set of joins or aggregations;

routing the set of joins or aggregations to a distributed environment outside the specific set of computing nodes;

detecting an exception in executing the set of joins or aggregations in the distributed environment;

routing, in response to the detecting, the set of joins or aggregations to the specific set of computing nodes.

19. The system of claim 13, the one or more processors further configured to perform routing, in response to determining that the set of joins or aggregations does not meet any condition of the set of conditions, the set of joins or aggregations to a distributed environment outside the specific set of computing nodes.

20. A non-transitory, computer-readable storage medium storing one or more sequences of instructions which when executed cause one or more processors to perform:

receiving an ontology query for querying an ontology from a user device, the ontology including a definition for each ontology entity type of a plurality of ontology entity types and a plurality of ontology entities instantiated from the plurality of ontology entity types, each ontology entity type of the plurality of ontology entity types having one or more properties;

identifying a set of permissions of a user account of the user device for accessing the ontology;

transforming the ontology query to a set of database queries, including a set of joins or aggregations;

determining whether execution of the set of joins or aggregations based on the set of permissions meets any condition of a set of conditions;

routing, in response to determining that the set of joins or aggregations meets a condition of the set of conditions, the set of joins or aggregations to a specific set of computing nodes;

receiving a reply from the specific set of computing nodes;

transmitting a result based on the reply to the user device in response to the ontology query.

* * * * *